June 24, 1952  H. C. GRAHAM  2,601,385

SCREW STUD

Filed April 1, 1946

INVENTOR.
Harry C. Graham

Patented June 24, 1952

2,601,385

UNITED STATES PATENT OFFICE 2,601,385

SCREW STUD

Harry C. Graham, Pittsburgh, Pa., assignor to Pittsburgh Screw and Bolt Corporation, Pittsburgh, Pa., a corporation of Pennsylvania Application April 1, 1946, Serial No. 658,752

1 Claim. (Cl. 85—41)

This invention is for a screw stud and a method of making the same, and is a continuation-in-part of my application Serial No. 524,095 filed February 26, 1944, now abandoned.

The present invention has for its principal object to provide an anchoring means in the form of a drive screw or screw stud, which may be used to anchor a metal part to a wooden foundation. It is intended for use for example in immovably securing a railroad tie plate to a wooden tie, or to secure the pedestal or base of a machine to a wooden foundation, or for like purposes.

A further important object of the invention is to provide a method for the production of screw studs of this type, and by means of which certain limitations heretofore encountered may be avoided.

In many cases where a metal plate, such as a tie plate, or the base of a machine is secured to wood, and subjected to heavy loads, there is a tendency for the metal to sink into the wood. The sinking of metal tie plates into wooden ties is one of the serious obstacles at the present time in the maintenance of railroad road-beds. This tendency of the metal plate—be it a tie plate or be it a machine—to sink into the wood, is accelerated when looseness develops between the metal and the wood so that there is sufficient vibration or relative movement to abraid the surface of the wood immediately under the metal and pulverize it. In order to overcome this, and eliminate or retard the penetration of the metal into the wood, the fastening means must be such that the fastening means can be tightly clamped against the wood at all times, and if looseness develops it can be taken up. In the case of a railroad, for example, looseness often develops from the shrinkage of the wood or the initial compression of the wood, due to the passage of trains over the track following the first few months after an installation has been in.

Lag screws or screw spikes have been extensively used for securing tie plates or other metal objects to wooden foundations, but when looseness develops in an assembly in which a screw spike or lag screw is employed, tightening can only be effected by further turning the screw spike or lag screw. This is undesirable because it disturbs the initial bond between the threads formed in the wood and the thread formed on the metal, which bond is established when the screw is first entered into the fresh wood. The loosening of this bond by subsequent turning of the screw creates a condition where, under continued vibration and repeated tightening of the screw, the screw will become loose in the wood.

In the case of screw spikes used for holding railroad ties to tie plates, it has been found that under conditions of heavy traffic the screw spikes will become so loose in four or five years that they will unscrew from the wood of their own accord, and can be picked out easily with the fingers. As a result, the use of screw spikes in railroad bed construction has been largely abandoned in favor of the conventional railroad spike.

It has also been proposed to use through bolts for anchoring a plate such as a tie plate to a wooden structure, but this is expensive and in many installations, through bolts cannot be used. In the case of a railway track, the use of a bolt passing entirely through the tie with a nut or bolt head at the bottom of the tie requires the installation of proper insulation to prevent excess loss of signal current from the track through the bolt into the moist ground that usually exists under the tie. Also, the use of through bolts in the case of railways involves considerable difficulty in their application, because of the excessive amount of excavation of the road bed that has to take place in initially installing the ties, or in replacing ties, or in replacing rails.

According to the present invention there is provided a screw stud having a shank portion with a high pitched thread, the pitch being at least 45° or greater, with reference to a transverse plane through the stud to enable the stud to be driven into wood by hammer blows, the threads on the shank cutting a thread in the wood as the stud is driven, the stud being caused to rotate as it is being driven under impact into the wood. Above this shank portion is a threaded stud portion having a conventional low pitched thread.

In the use of the stud, the shank is driven into the wood while the conventionally threaded upper end projects above the wood. It carries a nut which can be tightened down against the base of the machinery or metal plate or tie plate which is to be supported by the wood into which the stud is driven. To take up for any looseness than develops, this nut may be turned without turning the stud as a whole so that adjustment is provided for any looseness that develops without disturbing the initial bond between the wood and the shank of the stud. At the upper end of the stud is an anvil portion through which the blows necessary for driving the stud can be applied without damage to the threads. This anvil or head portion is preferably larger in diameter than the conventionally threaded part, and also constitutes a back up against which the nut may be screwed when it is necessary to remove the stud from the wood into which it is driven.

In general, the method contemplates upsetting one end of a piece of stock of a desired diameter at one end to form a head portion and to provide a portion of enlarged diameter back of the head portion. This enlarged portion back of the head portion is then threaded with a low pitch conventional thread, after which a nut is applied to the threaded portion. Then the remainder of the shank is rolled to form the spiral threads above referred to, throughout substantially the remainder of the length of the shank. Once the assembly is made with the final spiral threading operation completed, the nut cannot be removed from the assembly, and the only way in which an object fastened down with the stud can thereafter be removed is by complete removal of the stud.

My invention may be more fully understood by reference to the accompanying drawings, in which.

Figure 1:
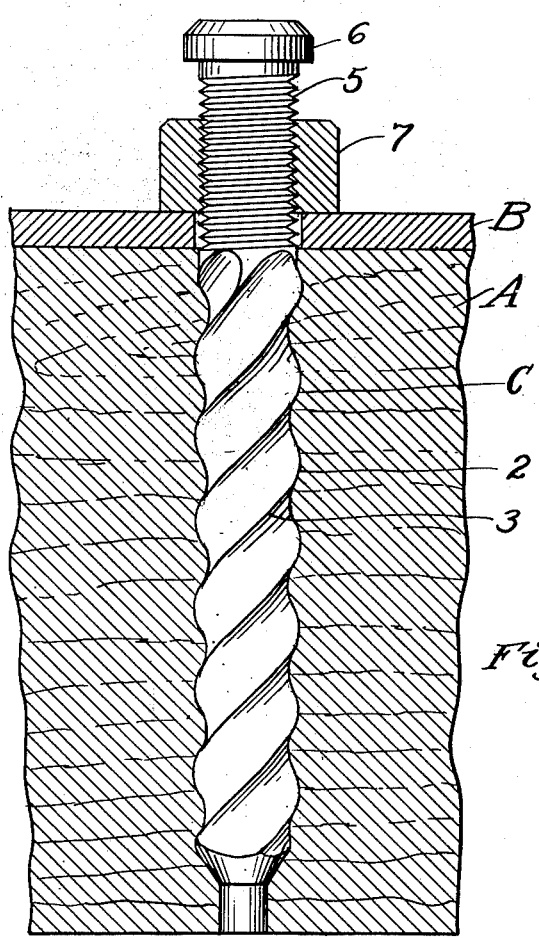
Fig. 1 is a view partly in section and partly in elevation showing a stud assembly of the present invention engaged in a piece of wood.

Referring first to Fig. 1, A designates a body of wood such, for example, as a railroad tie or other heavy timber, and B designates a metal object to be secured to the surface of A, and which, for example, may be a tie plate or the pedestal of a piece of track switch mechanism or of other machinery. The fastener is designated generally as C, and it has a shank portion 2 with driving threads 3 thereon, there being a tapered lower end to facilitate entering the stud into the wood. The threads, as above indicated, have a pitch such as to enable the fastener to be driven into the substance of the wood A and to cause the stud to rotate as it is driven. This pitch should be at least 45° or steeper, with respect to the transverse plane through the stud. The threads may be formed either by twisting of a shank of non-circular cross section, but they are preferably formed by being rolled into the shank.

Above the shank portion 2 having the driving threads thereon, there is a stud portion 5. This stud is provided as shown with ordinary standard bolt threads of low pitch angle, as compared with the threads 3 of high pitch angle. Above the portion 5 is an anvil or terminal portion 6 which is in the form of a head, and is of larger diameter than the threaded stud portion immediately under it, or than the shank portion. The threaded stud portion has a nut 7 thereon which may be screwed up to, or substantially against the anvil or head portion at the top of the stud, or which may be screwed down to the spirally threaded shank portion, but the travel of which is limited in this range. This is because the overall diameter of the spirally threaded portion is greater than the minimum inside diameter of the nut. The spiral threads on the shank of course cut into the wood, beyond the diameter of the bored hole. The fastener turns as it is being driven, so that these threads naturally cut a corresponding thread into the wood as the fastener is driven. If the root diameter of the spirally threaded portion were very substantially less than the diameter of the upper threaded stud, the shank portion would be unnecessarily weak. Moreover, by having the nut confined in the manner above described, it must be put on before the manufacture of the screw stud is completed, and hence cannot become detached or lost, and the possibility of the driving of the stud without the nut being in place is avoided. If the drivescrew stud were to be driven into the wood without any nut on it, it would be a very difficult task to thereafter back the fastener out of the wood, because there would be no surface on which an adequate "purchase" could be secured for exerting the necessary torque to screw the fastener out of the wood.

The bringing about of this desirable relation has presented a manufacturing obstacle which is eliminated by the method herein disclosed.

Figure 2:
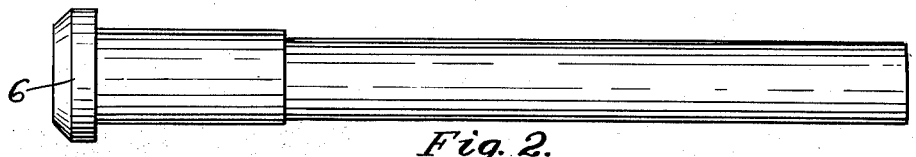
Fig. 2 is a side elevation showing the blank from which the stud is produced in the first stages of formation.

According to the method, a length of metal stock of predetermined diameter and of a length greater than the length of the stud to be produced is forged to the shape shown in Fig. 2 to produce the head portion, and the stud portion back of the head portion of enlarged diameter. Preferably this upsetting operation is performed while the metal is heated and in a single forging operation. In a typical example, starting with a ¾ inch diameter rod, the upper portion of the rod immediately below the head is upset to approximately 1⅜ inch diameter. Below the upset portion the diameter is unchanged.

Figure 3:
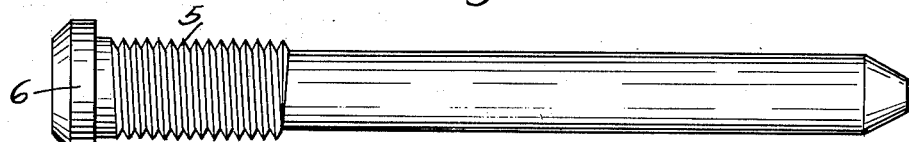
Fig. 3 is a similar view showing the same blank after the threading of the upper end but immediately before the application of the nut.
Figure 4:
Fig. 4 is a side elevation of the completed assembly.

After the upsetting has taken place a thread is formed in the upset upper portion as shown in Fig. 3. This thread is preferably produced by rolling. After the thread has been formed in the upper portion as shown in Fig. 3, a nut is applied thereto. With the nut in place the shank of the fastener is then rolled to form the driving threads of steep angular pitch. In the rolling of the spiral threads, the metal of the shank is rolled into the spiral ridges. The overall diameter of the shank is increased to perhaps ⅞ of an inch while the root diameter of the shank is decreased slightly under the original diameter of the rod to perhaps in the typical example given, $\tfrac{9}{16}$ of an inch.

The tapered lower end may be formed on the pin at any suitable stage in the manufacturing operation, preferably after upsetting and before threading.

If the portion of the shank immediately below the head were not upset before the thread is rolled therein, the upper portion of the pin would be of small diameter relative to the spirally threaded shank portion. On the other hand, by threading the upper portion of the shank and applying the nut thereto before rolling the steep spiral thread on the lower portion, it is possible to provide in the spirally threaded shank threads of substantial depth without unnecessarily reducing the diameter of the shank.

In the use of the fastener the nut is screwed to the top or to an intermediate position on the stud. The drive screw may then be driven into the wood. When the under face of the nut contacts the surface of the metal plate B, it will provide an absolute stop to prevent further penetration of the drive stud into the wood, so that the stud cannot be over-driven.

Once the stud has been driven, the nut cannot be removed without removing the entire stud. To remove the stud from the wood as may be necessary, for example, in replacing or resetting machinery or in repairing rails in a railroad track, the nut is backed up toward the head of the stud as far as it will go. Upon further turning of the nut with a wrench, the nut will jam against the head and cause the whole stud to rotate, whereby the stud may be screwed out of the wood. The anvil or head portion of the stud thus serves the double purpose of providing a terminal which may be hammered with a sledge hammer while protecting the threads from being damaged, and also provide an abutment against which the nut can be jammed to remove the fastener from the wood. As above indicated, any looseness that develops between the tie plate and the wood or any metal and the wood foundation can be taken up by merely screwing down on the nut without turning the stud at all, so that it is unnecessary to break the original contact between the metal of the spiral portion within the wood in taking up this looseness as is now necessary with lag screws and other common forms of fasteners. Experiments on railroad tracks extending over many years have shown that through the use of this invention, tie plate penetration into the ties can be very substantially retarded, and after the first few months of installation, it is rarely necessary to adjust the nuts because of the extremely low rate of tie plate penetration and the fact that the tie plate is held relative to the movement of the ties under railroad traffic conditions. Track maintenance at critical points has been very substantially reduced. Whereas it was heretofore extremely difficult to maintain the accurate setting of switch points on railroads, it has been found that with the studs as herein described, very little attention is required, because looseness of the fasteners cannot develop.

While I have illustrated and described certain specific embodiments of my invention, it will be understood that various modifications and changes may be made therein within the contemplation of my invention and under the scope of the following claim.

I claim:

A railway spike of the driven type for removably attaching a member to a wooden tie and comprising a shank of substantially uniform diameter with threads on the lower portion thereof of a lead and pitch of at least but not substantially greater than 45° such as to cause the spike to rotate when it is driven by hammer blows into the substance of a wooden tie, the upper portion of said shank having low pitch angle threads to receive a threaded nut, a nut on said upper portion, and an unthreaded anvil portion on the upper end of the shank to accept the blows required to drive the spike and protect the threads of the upper portion from mutilation, the anvil portion being in the form of a head of greater diameter than the shank and constituting a fixed abutment against which the nut on the upper portion may be backed.

HARRY C. GRAHAM.

REFERENCES CITED

The following references are of record in the file of this patent:

UNITED STATES PATENTS

| Number | Name | Date |
| --- | --- | --- |
| 262,404 | Gray | Aug. 8, 1882 |
| 395,925 | Rose | Jan. 8, 1889 |
| 488,195 | Goldie | Dec. 20, 1892 |
| 1,186,168 | Buck | June 6, 1916 |
| 1,190,069 | Abernethy | July 4, 1916 |
| 1,345,853 | Henger | July 6, 1920 |
| 1,519,308 | Hood | Dec. 16, 1924 |
| 1,649,049 | Williams | Nov. 15, 1927 |
| 1,788,750 | Snyder | Jan. 13, 1931 |
| 1,927,389 | Castner | Sept. 19, 1933 |
| 2,113,424 | Crowther | Apr. 5, 1938 |
| 2,266,892 | Mullen | Dec. 23, 1941 |
| 2,382,019 | Miller | Aug. 14, 1945 |

FOREIGN PATENTS

| Number | Country | Date |
| --- | --- | --- |
| 6,255 | Great Britain | Apr. 29, 1887 |
| 71,212 | Austria | Feb. 25, 1916 |
| 107,517 | Great Britain | July 5, 1917 |
| 108,796 | Austria | Feb. 10, 1928 |